(12) United States Patent
Uhrig

(10) Patent No.: US 11,760,229 B2
(45) Date of Patent: Sep. 19, 2023

(54) METHOD FOR OPERATING A HIGH-VOLTAGE ON-BOARD POWER SYSTEM OF A MOTOR VEHICLE, AND HIGH-VOLTAGE ON-BOARD POWER SYSTEM

(71) Applicant: Vitesco Technologies GmbH, Hannover (DE)

(72) Inventor: Florian Uhrig, Munich (DE)

(73) Assignee: Vitesco Technologies GmbH

( * ) Notice: Subject to any disclaimer, the term of this patent is extended or adjusted under 35 U.S.C. 154(b) by 71 days.

(21) Appl. No.: 17/051,223

(22) PCT Filed: Apr. 29, 2019

(86) PCT No.: PCT/EP2019/060870
§ 371 (c)(1),
(2) Date: Oct. 28, 2020

(87) PCT Pub. No.: WO2019/214976
PCT Pub. Date: Nov. 14, 2019

(65) Prior Publication Data
US 2021/0221256 A1    Jul. 22, 2021

(30) Foreign Application Priority Data

May 7, 2018    (DE) ............... 10 2018 207 014.8

(51) Int. Cl.
*B60L 58/31*    (2019.01)
*B60L 50/75*    (2019.01)
*H01M 16/00*    (2006.01)

(52) U.S. Cl.
CPC ............ *B60L 58/31* (2019.02); *B60L 50/75* (2019.02); *H01M 16/006* (2013.01); *H01M 2220/20* (2013.01); *H01M 2250/20* (2013.01)

(58) Field of Classification Search
CPC ...... B60L 58/31; B60L 50/75; H01M 16/006; H01M 2220/20; H01M 2250/20
(Continued)

(56) References Cited

U.S. PATENT DOCUMENTS

| 6,777,909 B1 | 8/2004 | Aberle et al. |
| 7,767,328 B2 | 8/2010 | Kobayashi et al. |

(Continued)

FOREIGN PATENT DOCUMENTS

| CN | 1663838 A | 9/2005 |
| DE | 19954306 A1 | 7/2001 |

(Continued)

OTHER PUBLICATIONS

English Translation of German patent application publication of Aberle et al. (DE 199 54 306 A1), Jul. 26, 2001, 17 pages, downloaded from Espacenet May 19, 2022. (Year: 2001).*

(Continued)

*Primary Examiner* — Hal Kaplan
(74) *Attorney, Agent, or Firm* — RatnerPrestia

(57) ABSTRACT

A method for operating a high-voltage on-board power system of a motor vehicle is proposed, in which the following steps are carried out: (a) generating a coupling signal for coupling a fuel cell of the vehicle to the on-board power system; (b) carrying out steps c) to f) depending on the coupling signal; (c) activating the fuel cell depending on the coupling signal; (d) determining a current operating voltage of the fuel cell; (e) adjusting an operating voltage of the high-voltage on-board power system decoupled from the fuel cell to the operating voltage of the fuel cell; and (f) coupling the fuel cell to the high-voltage on-board power system.

9 Claims, 1 Drawing Sheet

(58) Field of Classification Search
USPC .............................................................. 429/9
See application file for complete search history.

(56) References Cited

U.S. PATENT DOCUMENTS

| | | |
|---|---|---|
| 9,502,725 B2 | 11/2016 | Kanie et al. |
| 2016/0006659 A1 | 1/2016 | Kwon et al. |
| 2017/0203665 A1 | 7/2017 | Lee et al. |
| 2017/0271695 A1 | 9/2017 | Kemmer |

FOREIGN PATENT DOCUMENTS

| | | |
|---|---|---|
| DE | 112009004883 T5 | 6/2012 |
| DE | 102014224890 A1 | 1/2016 |
| DE | 102014224574 A1 | 6/2016 |
| JP | 2003168459 A | 6/2003 |
| WO | 2005013401 A1 | 2/2005 |

OTHER PUBLICATIONS

International Search Report and Written Opinion for International Application No. PCT/EP2019/060870, dated Jul. 23, 2019, with partial translation, 20 pages.
German Examination Report for German Application No. 10 2018 207 014.8, dated Jan. 10, 2019, 4 pages.
Waffler, S., "Hochkompakter bidirektionaler DC-DC-Wandler für hybridfahrzeuge," ETHzürich Research Collection, Doctoral Thesis, 2013, 395 pages (with English abstract).
Chinese Office Action for Chinese Application No. 201980030975.X, dated Mar. 4, 2023 with Search Report, 11 pages.

* cited by examiner

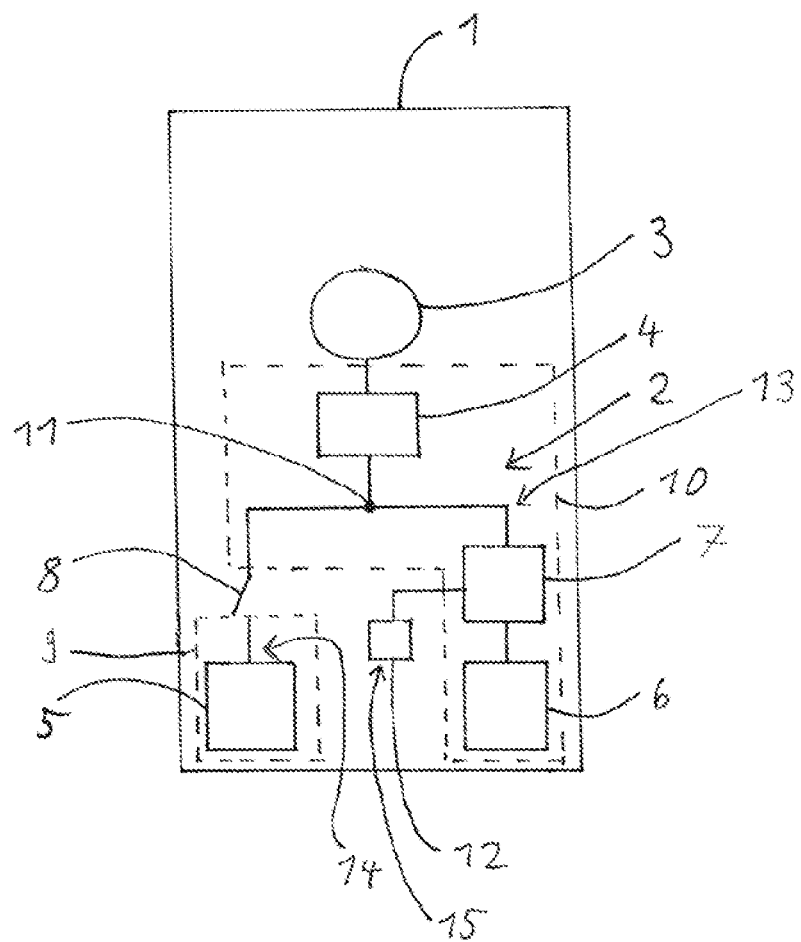

METHOD FOR OPERATING A HIGH-VOLTAGE ON-BOARD POWER SYSTEM OF A MOTOR VEHICLE, AND HIGH-VOLTAGE ON-BOARD POWER SYSTEM

CROSS REFERENCE TO RELATED APPLICATIONS

This application is the U.S. National Phase Application of PCT International Application No. PCT/EP2019/060870, filed Apr. 29, 2019, which claims priority to German Patent Application No. 10 2018 207 014.8, filed May 7, 2018, the contents of such applications being incorporated by reference herein.

FIELD OF THE INVENTION

The invention relates to a method for operating a high-voltage on-board power system of a motor vehicle. Further, the invention relates to a corresponding high-voltage vehicle on-board power system for a motor vehicle, having a high-voltage battery and a fuel cell. The high-voltage battery is connected to an inverter of an electric traction unit of the motor vehicle via a DC voltage converter.

BACKGROUND OF THE INVENTION

Known high-voltage on-board power systems with a high-voltage battery and a fuel cell usually have two DC voltage converters. A DC voltage converter is usually arranged between the fuel cell and the inverter of the electric traction unit, while the other DC voltage converter is arranged between the high-voltage battery and the inverter. One of the DC voltage converters allows the operating voltage of the fuel cell to be adjusted, while the other DC voltage converter is used to adjust the operating voltage of the high-voltage battery.

The two DC voltage converters require installation space and increase the weight of the vehicle. Power losses are also incurred by the DC voltage converters.

SUMMARY OF THE INVENTION

An aspect of the invention is to create a method for operating a high-voltage on-board power system and a high-voltage on-board power system, in which or with which a high-voltage on-board power system with a fuel cell and a high-voltage battery can be designed to be more compact and operated more energy-efficiently.

In a method according to an aspect of the invention a high-voltage on-board power system of a motor vehicle is operated. The following steps are carried out:
a) generating a coupling signal for coupling a fuel cell of the motor vehicle to the on-board power system;
b) carrying out steps c) to f) depending on the coupling signal;
c) activating the fuel cell depending on the coupling signal;
d) determining a current operating voltage of the fuel cell;
e) adjusting an operating voltage of the high-voltage on-board power system decoupled from the fuel cell to the operating voltage of the fuel cell; and
f) coupling the fuel cell to the high-voltage on-board power system.

An aspect of the invention is based on the finding that the fuel cell can also be connected to the inverter directly, i.e. without a DC voltage transformer, in particular if the operating voltage of the high-voltage on-board power system is adjusted to the operating voltage of the fuel cell before the fuel cell is coupled to the high-voltage on-board power system.

Fuel cells usually increase their operating voltage after activation. This would mean that the fuel cell—assuming it is connected directly to the inverter—could only be coupled to the high-voltage on-board power system once the operating voltage of the fuel cell matches the operating voltage of the high-voltage on-board power system. The fuel cell would therefore need to be operated for a period of time until the corresponding operating voltage is provided for coupling to the high-voltage on-board power system. The by the fuel cell is only used by the motor vehicle once the fuel cell is coupled to the high-voltage on-board power system. Before coupling, the fuel cell is operated in particular without using the generated energy.

By adjusting the operating voltage of the high-voltage on-board power system, i.e. in particular reducing it, in particular by using a DC voltage converter between the high-voltage battery and the inverter, the fuel cell can be directly coupled to the high-voltage on-board power system earlier than would be the case without adjusting the operating voltage of the high-voltage on-board power system. The energy of the fuel cell which is generated initially, i.e. shortly after the activation of the fuel cell, can thus be fed into the high-voltage on-board power system earlier, thereby allowing the high-voltage on-board power system or the fuel cell to be operated more energy-efficiently.

Furthermore, the connection between the fuel cell and the inverter, in particular formed only via a fuel cell connection switch, can avoid energy with less loss, which would arise, for example, in the case of an additional DC voltage converter for the fuel cell.

Furthermore, by dispensing with the additional DC voltage converter between the fuel cell and the inverter, installation space can be saved in the motor vehicle.

Preferably, it is provided that the fuel cell is coupled to the high-voltage on-board power system in step f) by means of a fuel cell connection switch. The fuel cell connection switch may be implemented, in particular, as a contactor. The fuel cell connection switch is preferably arranged between the fuel cell and the inverter. For coupling the fuel cell, the fuel cell connection switch is, in particular, closed. The fuel cell connection switch enables the fuel cell to be connected to the inverter in an energy-efficient and space-saving manner.

Furthermore, it is preferably provided that the fuel cell connection switch is opened before activation of the fuel cell in step c). By opening the fuel cell connection switch, the fuel cell is decoupled from the high-voltage on-board power system and can be activated without a significant voltage difference existing between the operating voltage of the fuel cell and the operating voltage of the high-voltage on-board power system.

Furthermore, it is preferable that the operating voltage of the high-voltage on-board power system is reduced in step e) to adjust it to the current operating voltage of the fuel cell. By reducing the operating voltage of the high-voltage on-board power system, the fuel cell can be connected to the high-voltage on-board power system in the power-up state or during the start-up phase in which the operating voltage of the fuel cell is continuously increasing, i.e. earlier than when the operating voltage of the high-voltage on-board power system is not reduced. This allows the energy of the fuel cell to be fed into the high-voltage on-board power system earlier than if the coupling of the fuel cell were to take place later, namely only when the fuel cell has reached an operating voltage which is similar to the operating voltage of the high-voltage on-board power system.

Furthermore, it is preferably provided that the operating voltage of the fuel cell and/or the operating voltage of the high-voltage on-board power system is increased after coupling the fuel cell in step f). By increasing the respective operating voltage, the inverter and thus also the traction unit can be supplied with a higher voltage, which makes the traction unit more powerful and more efficient. In particular, it is provided that the operating voltage of the high-voltage on-board power system is temporarily reduced for the coupling operation of the fuel cell and increased again after the coupling process is completed, for example to the original level.

In particular, the coupling of the fuel cell is carried out at a time when the motor vehicle is not demanding the full power of the traction unit, but rather preferably at a time when it is predicted that the power of the fuel cell will be required in the future. Therefore, the coupling signal can be generated and the coupling of the fuel cell to the on-board power system can be carried out according to the method.

Furthermore, it is preferably provided that a decoupling signal is generated after the coupling of the fuel cell, and the operating voltage of the high-voltage on-board power system is adjusted to the operating voltage of the fuel cell depending on the decoupling signal, wherein the fuel cell is operated in a de-energized state after the adjustment based on the decoupling signal, i.e. the voltage difference between the fuel cell and the high-voltage on-board power system is zero. The fuel cell is then decoupled from the high-voltage on-board power system in de-energized operation. In particular, the fuel cell is switched off or deactivated after decoupling. By raising the operating voltage of the high-voltage on-board power system, the fuel cell is operated in a de-energized state and the fuel cell can be decoupled from the high-voltage on-board power system by opening the fuel cell connection switch.

It is also provided that steps a) to f) are carried out in the specified order. By using the given order, the fuel cell is coupled to the high-voltage on-board power system in an energy-efficient manner and essentially without voltage surges.

An aspect of the invention also relates to a high-voltage on-board power system for a motor vehicle. The high-voltage on-board power system according to an aspect of the invention has a high-voltage battery and a fuel cell. The high-voltage battery is electrically connected to an inverter of an electric traction unit of the motor vehicle via a DC voltage converter. An important idea is that the fuel cell is electrically connected to the inverter directly, i.e. without a DC voltage converter.

The direct connection of the fuel cell to the inverter in this case describes the fact that there is no DC voltage converter arranged between the fuel cell and the inverter, i.e. no voltage adjustment takes place between the fuel cell and the inverter.

However, directly can mean that a switch, in particular a fuel cell connection switch, is arranged between the fuel cell and the inverter.

Due to the direct connection between the fuel cell and the inverter, the high-voltage on-board power system can be designed to be more compact and more energy-efficient. Furthermore, passive components of the high-voltage on-board power system can be reduced in size or completely eliminated.

Preferably, a fuel cell connection switch is arranged between the fuel cell and a power connection point of the high-voltage on-board power system, and the power connection point is directly electrically connected to the DC voltage converter, the inverter, and the fuel cell connection switch. The fuel cell and the high-voltage battery are connected in particular in parallel by means of the power connection point. The high-voltage on-board power system can then be supplied with energy from both the fuel cell and the high-voltage battery.

Furthermore, it is preferably provided that the high-voltage on-board power system has a control unit which is configured to generate a coupling signal by means of which the fuel cell is coupled to the high-voltage on-board power system, and/or a decoupling signal by means of which the fuel cell is decoupled from the high-voltage on-board power system. The control unit can then preferably also adjust the operating voltage of the high-voltage on-board power system. The adjustment of the operating voltage of the high-voltage on-board power system is preferably carried out via the DC voltage converter. To this end, the control unit can be connected to the DC voltage converter for control signal transmission.

Advantageous embodiments of the method according to an aspect of the invention are to be regarded as advantageous embodiments of the high-voltage on-board power system. The relevant components of the high-voltage on-board power system are each designed to carry out the respective method steps.

Further features of an aspect of the invention emerge from the claims, the figures and the description of the figures.

BRIEF DESCRIPTION OF THE DRAWINGS

Exemplary embodiments of the invention are explained in more detail below with the aid of a schematic drawing.

The FIGURE shows a schematic plan view of a motor vehicle with an exemplary embodiment of a high-voltage on-board power system according to the invention.

DETAILED DESCRIPTION OF THE PREFERRED EMBODIMENTS

The FIGURE shows a schematic plan view of a motor vehicle 1. The motor vehicle 1 has a high-voltage on-board power system 2 and a traction unit 3.

The traction unit 3 can be designed as an electric motor, for example. The traction unit 3 provides in particular the main drive power of the motor vehicle 1.

The high-voltage on-board power system 2 has an inverter 4, a fuel cell 5, a high-voltage battery 6, a DC voltage converter 7 and a fuel cell connection switch 8.

The fuel cell 5 is electrically connected to the high-voltage on-board power system 2 via the fuel cell connection switch 8. More precisely, by closing the fuel cell connection switch 8, a first high-voltage on-board power system section 9, which comprises the fuel cell 5, is electrically connected to a second high-voltage on-board power system section 10, which comprises the high-voltage battery 6 and the DC voltage converter 7.

According to the exemplary embodiment, the high-voltage battery 6 is only connected to the inverter 4 via the DC voltage converter 7.

A power connection point 11 is arranged between the fuel cell connection switch 8, the inverter 4 and the DC voltage transformer 7. According to the exemplary embodiment, the fuel cell connection switch 8 is in turn arranged directly between the fuel cell 5 and the power connection point 11.

Furthermore, the high-voltage on-board power system has a control unit 12, which in accordance with the exemplary embodiment is connected to the DC voltage transformer 7. For example, the control unit 12 can control the DC-voltage transformer 7 in order to adjust, in particular to increase or decrease, an operating voltage 13 of the high-voltage on-board power system 3, in particular of the second high-voltage on-board power system section 10.

An operating voltage 14 is provided by the fuel cell 5. If the fuel cell connection switch 8 is open, the operating voltage 14 of fuel cell 5 is only applied to the first high-voltage on-board power system section 9.

For example, a method for operating the high-voltage on-board power system 2 now proceeds as follows. A coupling signal 15 is generated for coupling the fuel cell 5 to the on-board power system. Then, according to the exemplary embodiment, a check is carried out to determine whether the fuel cell connection switch 8 is open. If this is the case, the fuel cell 5 is activated depending on the coupling signal 15. The current operating voltage 14 of the fuel cell 5 is determined. According to the exemplary embodiment, the operating voltage 13 of the high-voltage on-board power system 2 is then adjusted to the operating voltage 14 of the fuel cell 5, or brought to the same voltage level, by means of the DC voltage converter 7. The high-voltage on-board power system (2) is thereby configured to adjust the operating voltage (13) of the high-voltage on-board power system (2) to the operating voltage (14) of the fuel cell (5) in step e). This means in particular that the operating voltage 13 of the high-voltage on-board power system 2, in particular the second high-voltage on-board power system section 10, can be reduced. In particular after the adjustment of the operating voltage 13 of the high-voltage on-board power system 2, the fuel cell 5 is directly coupled to the high-voltage on-board power system 2, in other words the fuel cell connection switch 8 is closed.

The adjustment of the operating voltage 13 of the high-voltage on-board power system 2 to the operating voltage 14 of the fuel cell 5 means that, in particular, potential equalization is obtained and the fuel cell connection switch 8 can be closed without current flow. The fuel cell 5 can now feed the traction unit 3 or a drive train of the motor vehicle 1 without the losses of a DC voltage transformer.

The invention claimed is:

1. A method for operating a high-voltage on-board power system of a motor vehicle, comprising:
    a) generating a coupling signal for coupling a fuel cell of the motor vehicle to the on-board power system, and/or a decoupling signal, by which the fuel cell is decoupled from the high-voltage on-board power system, wherein the coupling signal and/or the decoupling signal trigger adjustment of an operating voltage of the high-voltage on-board power system;
    b) activating the fuel cell;
    c) determining a current operating voltage of the fuel cell;
    d) adjusting the operating voltage of the high-voltage on-board power system decoupled from the fuel cell to the current operating voltage of the fuel cell; and
    e) coupling the fuel cell directly to the high-voltage on-board power system.

2. The method as claimed in claim 1, wherein the fuel cell is coupled to the high-voltage on-board power system in step e) by a fuel cell connection switch.

3. The method as claimed in claim 2, wherein the fuel cell connection switch is opened before the fuel cell is activated in step b).

4. The method as claimed in claim 1, wherein the operating voltage of the high-voltage on-board power system is reduced in step d) to adjust it to the operating voltage of the fuel cell.

5. The method as claimed in claim 1, wherein the steps a) to e) are carried out in the specified order.

6. The method as claimed in claim 1, wherein the operating voltage of the fuel cell and/or the operating voltage of the high-voltage on-board power system is increased after coupling the fuel cell in step e).

7. A method for operating a high-voltage on-board power system of a motor vehicle, comprising:
    a) generating a coupling signal for coupling a fuel cell of the motor vehicle to the on-board power system;
    b) activating the fuel cell;
    c) determining a current operating voltage of the fuel cell;
    d) adjusting an operating voltage of the high-voltage on-board power system decoupled from the fuel cell to the current operating voltage of the fuel cell; and
    e) coupling the fuel cell directly to the high-voltage on-board power system,
    wherein a decoupling signal is generated after coupling the fuel cell, and the operating voltage of the high-voltage on-board power system is adjusted to the current operating voltage of the fuel cell in response to the decoupling signal, wherein the fuel cell is operated in a de-energized state after the adjustment, the fuel cell being decoupled from the high-voltage on-board power system in de-energized operation.

8. A high-voltage on-board power system for a motor vehicle, comprising:
    a high-voltage battery; and
    a fuel cell,
    the high-voltage battery being connected to an inverter of an electric traction unit of the motor vehicle via a DC voltage converter,
    wherein the fuel cell is directly electrically connected to the inverter,
    wherein the high-voltage on-board power system is configured to adjust an operating voltage of the high-voltage on-board power system to an operating voltage of the fuel cell, and
    wherein the high-voltage on-board power system has a control unit, which is configured to generate a coupling signal, by which the fuel cell is coupled to the high-voltage on-board power system, and/or a decoupling signal, by which the fuel cell is decoupled from the high-voltage on-board power system, and wherein the coupling signal and/or the decoupling signal trigger the adjustment of the operating voltage of the high-voltage on-board power system.

9. The high-voltage on-board power system as claimed in claim 8, wherein a fuel cell connection switch is arranged between the fuel cell and a power connection point of the high-voltage on-board power system, and the power connection point is directly electrically connected to the DC voltage converter, the inverter and the fuel cell connection switch.

\* \* \* \* \*